United States Patent [19]

Aoki et al.

[11] Patent Number: 5,047,869
[45] Date of Patent: Sep. 10, 1991

[54] RECORDING DEVICE FOR ELECTRONIC STILL CAMERA

[75] Inventors: Harumi Aoki; Nobuya Sakai, both of Tokyo, Japan

[73] Assignee: Asahi Kogaku Kogyo K.K., Tokyo, Japan

[21] Appl. No.: 268,303

[22] Filed: Nov. 7, 1988

[30] Foreign Application Priority Data

Nov. 6, 1987 [JP] Japan .................................. 62-280720

[51] Int. Cl.⁵ .......................... H04N 5/76; H04N 5/781
[52] U.S. Cl. ..................................... 358/341; 358/342; 358/906
[58] Field of Search .................. 366/8, 9.1, 16.1, 33.1, 366/351; 358/341, 335, 342

[56] References Cited

U.S. PATENT DOCUMENTS

| | | | |
|---|---|---|---|
| 4,065,794 | 12/1977 | Shutterly | 360/8 |
| 4,583,131 | 4/1986 | Dakin | 358/341 |
| 4,692,816 | 8/1987 | Sugiyama et al. | 360/19.1 |
| 4,725,897 | 2/1988 | Konishi | 358/341 |

FOREIGN PATENT DOCUMENTS 176379  3/1987  Japan ..................................... 358/342

Primary Examiner—Roy N. Envall, Jr.
Assistant Examiner—Huy Nguyen
Attorney, Agent, or Firm—Sughrue, Mion, Zinn, Macpeak & Seas

[57] ABSTRACT

A recording device for an electronic still camera in which, even in the case where, in a recording mode in which video signals and compressed audio signals are recorded in pairs, an audio signal is not recorded after the recording of a video signal and another video signal is recorded immediately thereafter, the recording operation can be achieved readily and the signal recording or reproducing operation can be started quickly. In accordance with the invention a control unit, in response to a video signal recording instruction, operates to record a video signal on a track which is removed by a two-track pitch in one direction from the track where the preceding video signal has been recorded, and, in response to an audio signal recording instruction, operates to record a compressed audio signal on a track which is removed by a one-track pitch in the same direction from the track where the preceding video signal has been recorded.

4 Claims, 5 Drawing Sheets

FIG. 6 (A) REC. IMAGE OR AUDIO SIG.

FIG. 6 (B) CONTIN. REC. ONLY IMAGE SIG. IN AV MODE

RECORDING DEVICE FOR ELECTRONIC STILL CAMERA

BACKGROUND OF THE INVENTION

The present invention relates to a recording device for an electronic still camera for recording video signals and time compressed audio signals on a memory disc such as a magnetic disc.

In an example of an electronic still camera of the same general type as that to which the present invention pertains, FM-modulated video signals and compressed audio signals are recorded on concentric tracks on a magnetic disc. Such a camera has a first mode in which audio signals and video signals are recorded in pairs, and a second mode in which audio signals and video signal are recorded independently of each other.

In the first mode, the tracks on the magnetic disc are divided into those in a video track region and those in an audio track region. The magnetic head records a video signal on a predetermined video track in the video track region and then moves to the audio track in the audio track region which corresponds to the video track. After recording an audio signal on the audio track, the magnetic head moves to the next video track.

Accordingly, in the case where video signals and time compressed audio signals are alternately recorded, the magnetic head is positioned on the track where a signal is to be recorded, and therefore the signal can be recorded immediately and the magnetic head moved efficiently.

However, in the case where, after a video signal is recorded, an audio signal is not recorded, and instead another signal is recorded, it is necessary to move the magnetic head to the following video track. That is, it is necessary that the operator operate a track number setting switch and depress the release button after confirming the track number on a track number display unit. As a result, the operation is considerably intricate. In addition, since the video track and the audio track are positioned away from each other, the amount of movement of the magnetic head is great, and thus it is difficult to start the signal recording or reproducing operation quickly. Also, since the magnetic head moves from a video track to an audio track and then to the next video track; that is, since the magnetic head is moved twice and stopped twice, due to the large amount of movement, the magnetic head driving device is operated inefficiently and liable to become out of order.

SUMMARY OF THE INVENTION

In view of the foregoing, an object of this invention is to provide a recording device for an electronic still camera in which, even in the case where, in a recording mode in which video signals and compressed audio signals are recorded in pairs, an audio signal is not recorded after the recording of a video signal and another video signal is recorded immediately thereafter, the recording operation can be achieved readily and the signal recording or reproducing operation can be started quickly.

Another object of the invention is to provide a recording device for an electronic still camera in which the number of times of movement of the recording head is decreased, that is, the recording head is moved efficiently.

The foregoing objects of the invention have been achieved by the provision of a recording device for an electronic still camera in which (as shown FIG. 1A), control means controls recording head drive means to move a recording head a predetermined track pitch and controls a video/audio change-over switch to selectively supply a video signal or time compressed audio signal to the recording head so that video signals and time compressed audio signals are recorded on a memory disc with the recording head, and which, according to a first aspect of the invention, comprises: a video signal recording switch for inputting a video signal recording instruction, and an audio signal recording switch for inputting an audio signal recording instruction, and in which the control means, in response to the video signal recording instruction, operates to record a video signal on a track which is removed by a two-track pitch in one direction from the track where the preceding video signal has been recorded, and, in response to the audio signal recording instruction, operates to record a time compressed audio signal on a track which is removed by a one-track pitch in the same direction from the track where the preceding video signal has been recorded.

Furthermore, the objects of the invention have been achieved by the provision of a recording device for an electronic still camera in which (as shown in FIG. 1B), control means controls recording head drive means to move a recording head a predetermined track pitch and controls a video/audio change-over switch to selectively supply a video signal or time compressed audio signals to the recording head so that video signals and time compressed audio signals are recorded on a memory disc with the recording head, and which, according to a second aspect of the invention, comprises: a video signal recording switch for inputting a video signal recording instruction, an audio signal recording switch for inputting an audio signal recording instruction; and type-of-recorded-signal storing means for storing data indicating whether a recorded signal is a video signal or a time compressed audio signal, and in which said recording head comprises head elements (X and Y) which face two adjacent tracks simultaneously, and said control means, in response to the audio signal recording instruction, causes the head element (X) to record a time compressed audio signal on a memory disc, and then moves the recording head by a one-track pitch towards the head element (Y), and in response to the video signal recording instruction, in the case where the preceding instruction is an audio signal recording instruction, causes the head element (X) to record a video signal on the memory disc, and then moves the recording head by a one-track pitch towards the head element (Y), and in the case where the preceding instruction is a video signal recording instruction, causes the head element (Y) to record a video signal on the memory disc, and then moves the recording head by a two-track pitch towards the head element (Y), whereby concentric video signal recording tracks and compressed audio signal recording tracks are arranged alternately on the memory disc.

DESCRIPTION OF THE PREFERRED EMBODIMENTS

Preferred embodiments of the invention will be described with reference to the accompanying drawings.

Figure 1A:
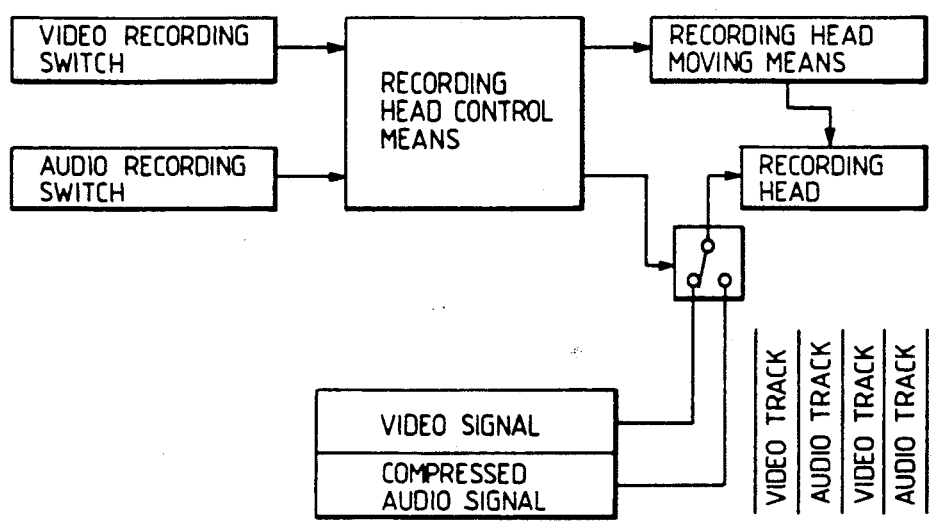
FIG. 1A is a block diagram showing the arrangement of a recording device for an electronic still camera according to a first embodiment of this invention.
Figure 1B:
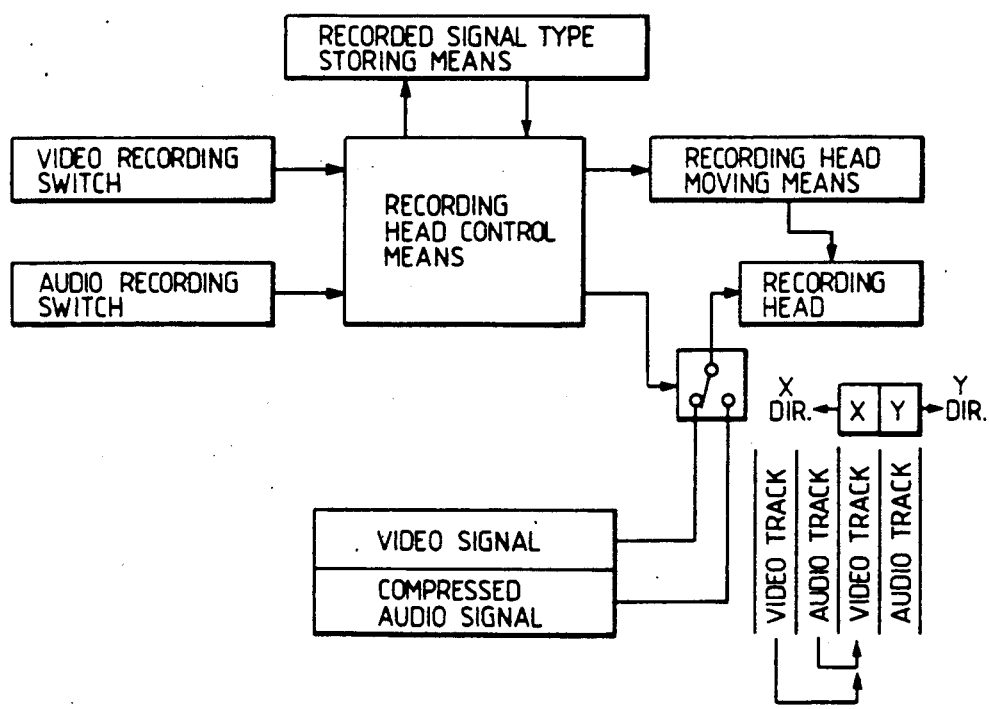
FIG. 1B is a block diagram showing the arrangement of a recording device for an electronic still camera according to a second embodiment of the invention.
Figure 2:
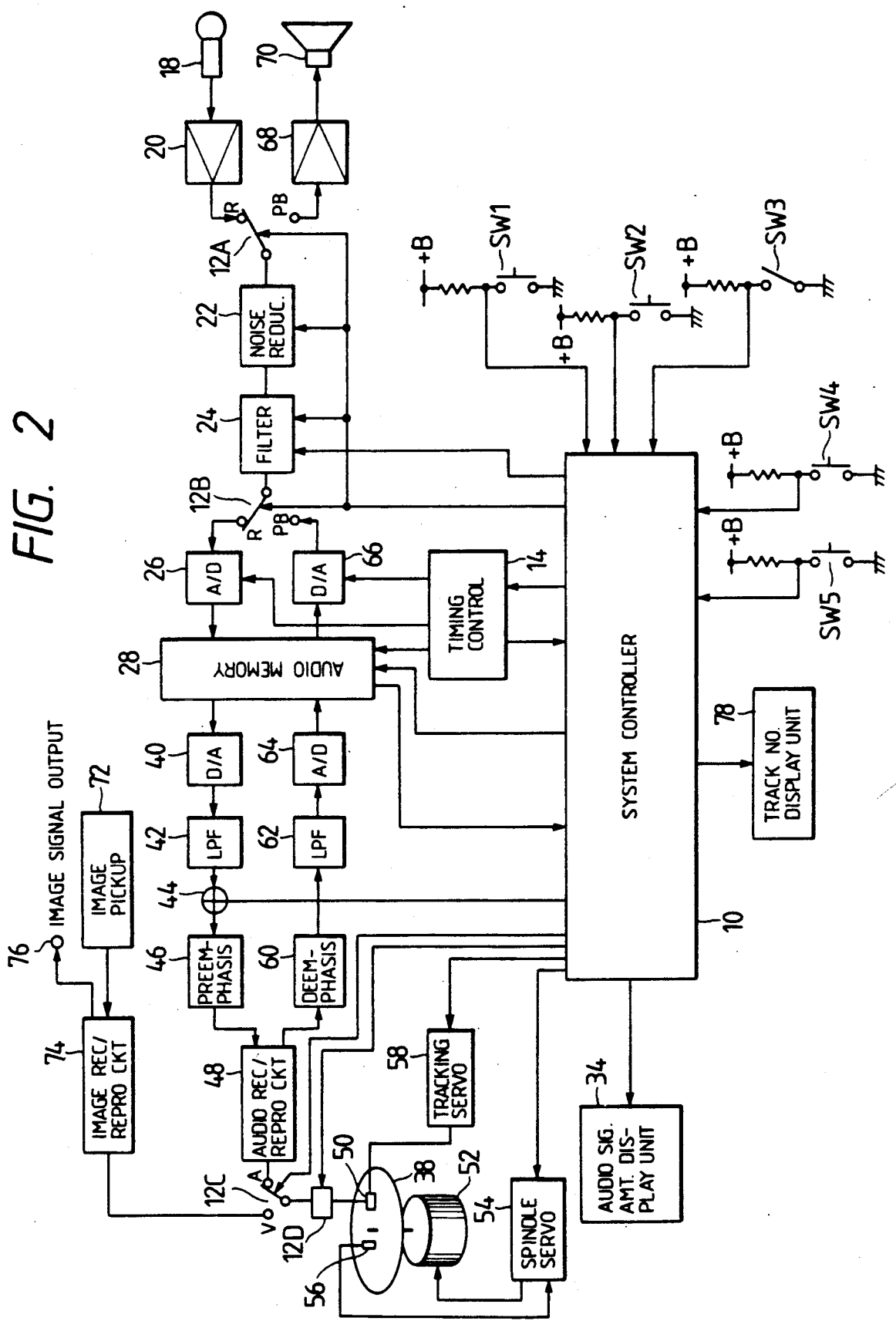
FIG. 2 is a block diagram showing the arrangement of an electronic still camera according to the invention.

FIG. 2 is a block diagram showing an electronic still camera to which the technical concept of the invention is applied.

In FIG. 2, reference numeral 10 designates a system controller. In response to input signals provided by operating switches SW1 through SW5, the system controller 10 operates recording/reproducing change-over switches 12A and 12B, a video/audio change-over switch 12C, and a head change-over switch 12D, thereby to control other circuit elements directly or through a timing control circuit 14.

Figure 4:
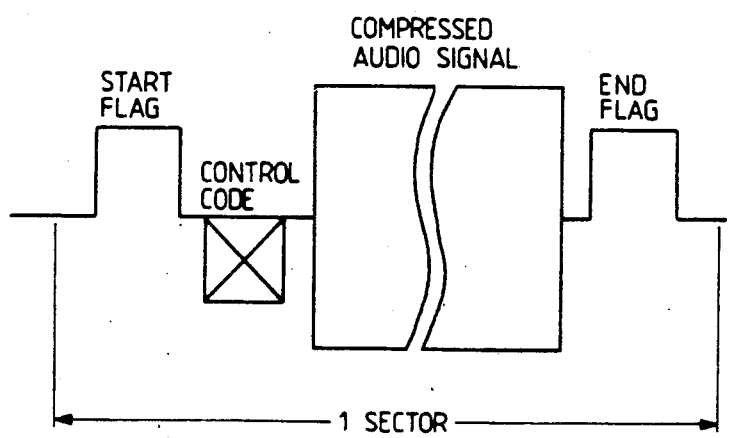
FIG. 4 is a waveform diagram showing the arrangement of a compressed audio signal and signals added thereto.

The operating switch SW1 is a sound recording switch. When the switch SW1 is turned on, an audio signal applied to a microphone 18 is converted into an electrical signal, which is amplified by a recording amplifier 20. Noise components are eliminated from the output signal of the amplifier 20 through the recording/reproducing change-over switches, a noise reduction circuit 22, and a filter 24. The output signal of the filter 24 is applied through the recording/reproducing change-over switch 12B to an A/D (analog-to-digital) converter 26, where it is converted into digital data. The digital data are successively stored in an audio memory 28, and the amount of digital data thus stored is displayed on a display unit 34. After the data storing operation, the audio digital data are successively read out of the audio memory 28 and applied to a D/A (digital-to-analog) converter 40 where they are converted into analog data. The time compression is accomplished by making the speed of reading out data from the audio memory 28 more rapid than that of storing the data. The output signal of the D/A converter 40 is applied to a low-pass filter 42 where the waveform is smoothed. The output signal of the low-pass filter 42 is applied to a synthesizing circuit 44 where, for each sector of a predetermined track on a magnetic disc 38, a start flag, a control code, and an end flag supplied by the system controller 10 are added before and after the output signal of the low-pass filter 42, namely, a compressed audio signal, in the conventional manner (see FIG. 4). The addition of these data is standardized. The output of the synthesizing circuit 44 is applied to a preemphasis circuit 46 where the high frequency component thereof is emphasized. The output of the preemphasis circuit 46 is applied to an audio recording and reproducing circuit 48 where it is FM-modulated and suitably amplified. The output of the circuit 48 is applied through the head change-over switch 12D to a magnetic head 50 so that the FM-modulated audio data is recorded on a predetermined track on the magnetic disc 38.

The magnetic disc 38 is turned by a spindle motor 52, the rotation of which is servo-controlled by a pulse (or a feedback signal) provided by a PG coil 56. On the other hand, according to a control instruction from the system controller 10, the magnetic head 50 is moved radially of the magnetic disc 38 by means of a tracking servo circuit 58; that is, tracking of the magnetic head is carried out.

Operating switches for reproduction are not shown in FIG. 2.

In a sound reproducing operation, the audio data picked up by the magnetic head 50 is applied through the head change-over switch 12D and the video/audio change-over switch 12C to the audio recording and reproducing circuit 48 where it is suitably amplified and subjected to FM demodulation. The output of the circuit 48 is applied to a deemphasis circuit 60, which is opposite in operating characteristic to the above-described preemphasis circuit 60. The output of the circuit 46 is applied to a low-pass filter 62 where the high frequency component is removed. The output of the low-pass filter 62 is applied to an A/D circuit 64 where the signal is converted into digital data. Thus, time compressed audio data are successively stored in the audio memory 28. The audio data are read out of the audio memory 28 at a speed inversely proportional to the time compression rate, that is, they are subjected to time-axis expansion, and are then converted into an analog signal by a D/A converter 66. The output of the converter 66 is applied through the recording/reproducing change-over switch 12B to the filter 24 where the waveform of the signal is smoothed. The output of the filter 24 is applied to the noise reduction circuit 22 where its noise components are attenuated. The output of the noise reduction circuit 22 is applied through the recording/reproducing change-over switch 12A to a reproducing amplifier 68 where it is suitably amplified. The output of the amplifier 68 is applied to a loudspeaker 70 and the audio signal reproduced.

The switch SW2 is an image recording switch. When the switch SW2 is operated, picture element signals provided by an image sensor element 72 are successively supplied to an image recording and reproducing circuit 74 which, in turn, forms a compound FM-modulated video signal. The video signal thus formed is applied through the video/audio change-over switch 12C and the head change-over switch 12D to the magnetic head 50 and recorded on a predetermined track on the magnetic disc 38.

In the image reproducing mode, the compound video signal read by the magnetic head 50 is applied to the image recording and reproducing circuit 74 where it is amplified and subjected to FM demodulation. The output of the circuit 74 is provided at its terminal 76.

The operating switch SW3 is an AV/N change-over switch, that is, a switch for selecting either a sound and image recording (AV) mode or a normal (N) mode. In the AV mode, image recording tracks and compressed sound recording tracks are alternately arranged on the magnetic disc 38, and therefore after only video signals have been continuously recorded can after-recording of compressed audio signals be performed. On the other hand, in the N mode, image recording tracks and time compressed sound recording tracks can be arranged as desired. The AN mode and the N mode will be described later in more detail.

The operating switch SW4 is an increment switch used to shift the magnetic head 50 by one track in one direction, for instance, radially inwardly of the disc.

The operating switch SW5 is a decrement switch which is operated to shift the magnetic head 50 by one track in the opposite direction, for instance, radially outwardly of the disc.

Further in FIG. 2, reference numeral 78 designates a track number display unit which displays the track number where a selected one of the head elements of the magnetic head 50 is positioned.

Figure 3:
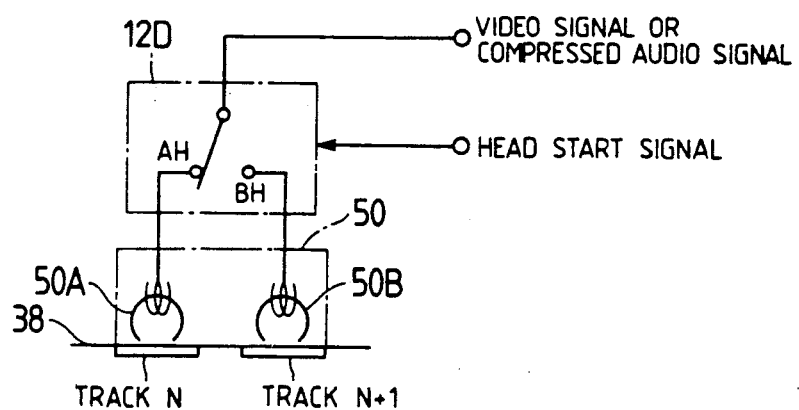
FIG. 3 is an explanatory diagram showing the relationships between a magnetic head and recording tracks.

The magnetic head 50, as shown in FIG. 3, is composed of an A head element 50A and a B head element 50B. The distance between these head elements is equal to the track pitch of the concentric tracks. Therefore, when the A head element 50A follows the N-th track, the B head element 50B follows the (N+1)-th track.

When the armature of the head change-over switch 12D is set to the contact AH, the A head element 50A is used for the signal recording or reproducing operation, and when the armature is set to its contact BH, the B head element 50B is used.

Figure 5:
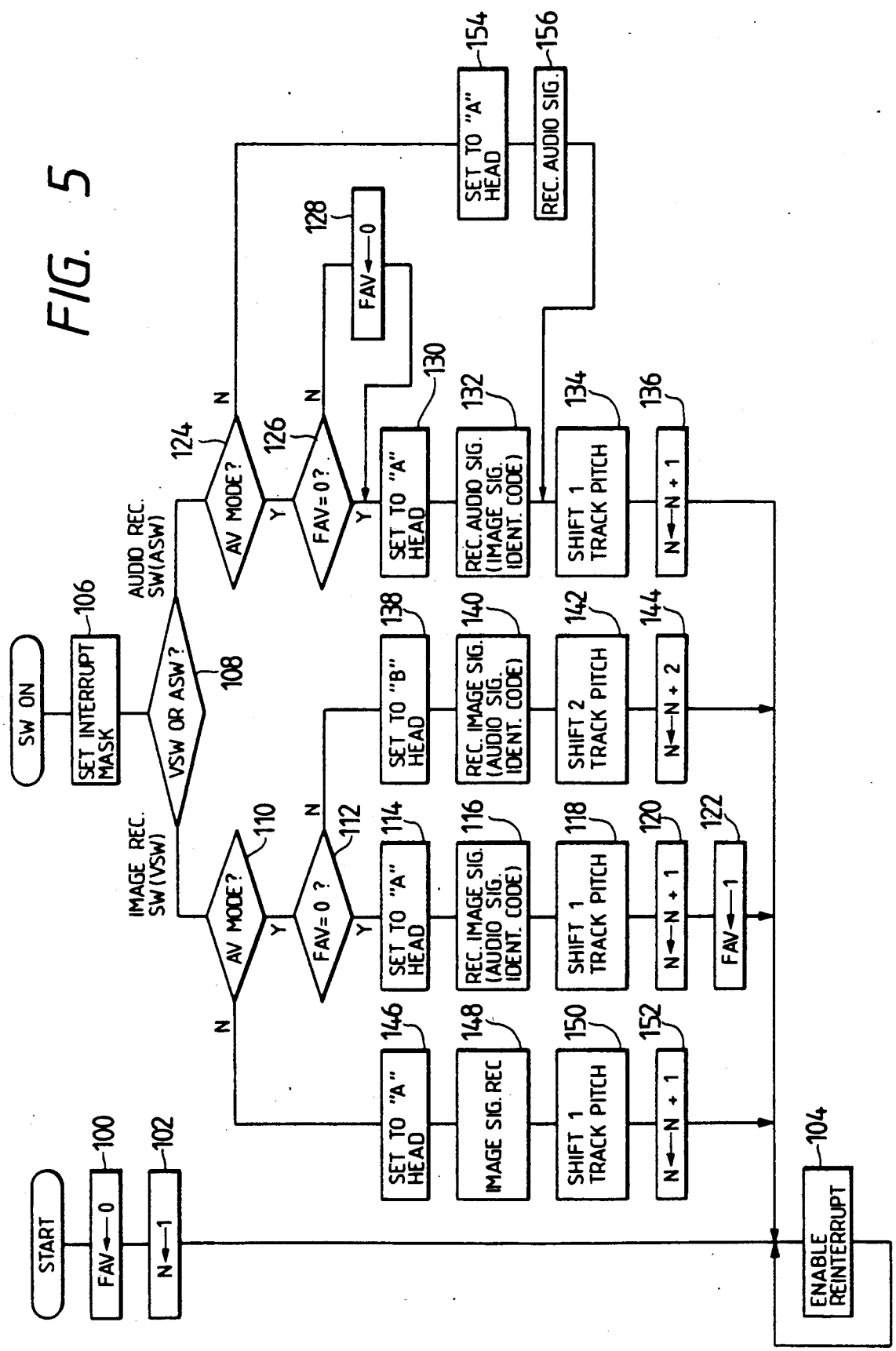
FIG. 5 is a flowchart showing the control procedure of a system controller.

FIG. 5 is a flowchart showing the control procedure for the system controller 10. The control procedure will be described with reference to FIG. 6.

When the system power switch of the electronic still camera is turned on, execution of the program is started, and in Steps 100 and 102 initializing operations are carried out. More specifically, in Step 100, the flag FAV, which is used to store the type of recording signal in the AV mode, is set to "0". The flag FAV is employed to determine, for the recording of audio signals, whether the preceding recording operation was for video signals or compressed audio signals. In the case where the preceding recording operation was for video signals, the flag FAV is raised to "1". In the following Step 102, the track number N is set to "1".

In Step 104, the interrupt mask is reset so that interruption by switching is enabled, that is, the occurrence of an interrupt is waited for.

First, the operation with the AV/N change-over switch SW3 operated for the AV mode will be described.

In the case where the image recording switch SW2 and the sound recording switch SW1 are alternately operated so that video signals and time compressed audio signals are alternately recorded, the armature of the head change-over switch 12D is set to the contact AH so that only the A head element 50A is used.

Figure 6:
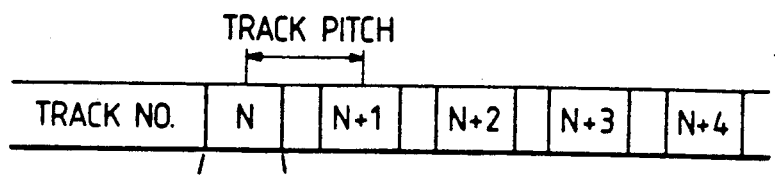
FIGS. 6(A) and 6(B) are explanatory diagrams indicating the movement of the magnetic head, selected head elements, and the recording of video signals and compressed audio signals in an AV mode.
Figure 6:
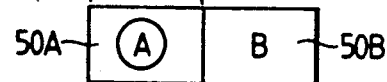
Figure 6:
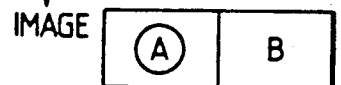
Figure 6:
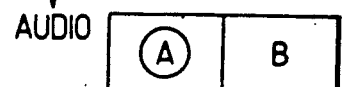
Figure 6:
Figure 6:
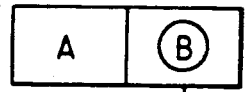
Figure 6:
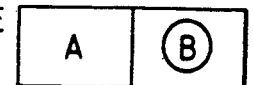

As shown in FIG. 6 at (A), when a video signal is recorded on the N-th track with the image recording switch S operated, the magnetic head 50 is shifted by one track inwardly, that is, it is moved to the (N+1)-th track. When, under this condition, the sound recording switch SW1 is operated, a time compressed audio signal is recorded on the (N+1)-th track, and then the magnetic head 50 is shifted by one track inwardly, that is, it is moved to the (N+2)-th track. When, under this condition, the switch SW2 is operated, a video signal is recorded on the (N+2)-th track, and the magnetic head 50 is shifted to the (N+3)-th track.

This will be described with reference to FIG. 5. Upon operation of the image recording switch SW2, in Step 106 the interrupt mask is set to disallow reinterruption, and then, in Steps 108, 110 and 112, the indicated decisions are carried out. Subsequently, in Steps 114, the head change-over switch 12D is set to the contact AH, and a video signal is recorded on the N-th track.

The video signal is multiplexed with a conventional standardized DPSK signal, and a video sub-code indicating the fact that a time compressed audio signal corresponding to the video signal is recorded in the (N+1)-th track is added in the user's area of the DPSK signal.

Accordingly, when the video signal of the N-th track is reproduced by the A head element 50A, the compressed audio signal of the (N+1)-th track corresponding to the video signal is automatically reproduced.

After the video signal has been recorded on the N-th track, the magnetic head 50 is shifted by one track inwardly (or toward the B head element); that is, it is moved to the (N+1)-th track as shown at (A) in FIG. 6.

In the following Step 120, the value of N is increased, and in Step 122, the flag FAV is set.

In the next Step 104, reinterruption is enabled, thus allowing the system to wait for the occurrence of an interrupt.

When the sound recording switch SW1 is operated, the processes in Steps 106, 108 and 124 are performed, and in Step 128 the flag FAV is set. Then, in Step 130 the armature of the head change-over switch 12D is set to the contact AH. However, since the armature has been set to the contact AH in Step 114, the state of the switch 12D remains as it is.

In Step 132, a compressed audio signal is recorded. In order to indicate the video signal which corresponds to the compressed audio signal, the track number of the video signal is added to the compressed audio signal, thus forming a part of a control code (see FIG. 4) provided before the time compressed audio signal.

In the following Step 134, the magnetic head 50 is shifted by one track inwardly, and in Step 136, the value of N is increased. In Step 104, reinterruption is enabled, thus allowing the system to wait for the occurrence of an interrupt.

The above-described operations are carried out repeatedly so that the video signals and the time compressed audio signals are alternately recorded by the A head element 50A only.

An operation of continuously recording video signals in the AV mode will now be described with further reference to FIG. 6, particularly, part (B) of FIG. 6.

When the image recording switch SW2 is operated, in Steps 106 through 122 operations are carried out as described above, so that a video signal is recorded on the N-th track with the A head element 50A. In Step 104, interruption is enabled, thus allowing the system to wait for the occurrence of an interrupt.

Under this condition, the image recording switch SW2 is operated again. In this case, since the flag FAV has been set in Step 122, Step 138 is effected after Steps 106 through 122 so that the armature of the head change-over switch 12D is moved to the contact BH. This switching is necessary because, as shown at (B) in FIG. 6, the A head element 50A and the B head element 50B confront a audio track and a video track, respectively. This is due to the fact that, after the first image recording operation, in Step 118 the magnetic head 50 is shifted only one track pitch.

In Step 140, a video signal is recorded, and then in Step 142, the magnetic head 50 is shifted by two tracks inwardly. In the following Step 144, a new value (N+2) is employed as the value of N.

Accordingly, as shown at (B) in FIG. 6, recording a video signal can be performed with the B head element 50B and recording an audio signal can be carried out with the A head element 50A. Therefore, it is unnecessary to move the magnetic head 50 again before the recording operation, and thus the recording operation can be started immediately.

Next, in Step 104, reinterruption is enabled, allowing the system to wait for the occurrence of an interrupt.

When the image recording switch SW2 is operated again, in Steps 106 through 112 and in Steps 138 through 144, the indicated operations are carried out. When the sound recording switch SW1 is operated, in Steps 106, 108, 124 and 126 through 136 the indicated operations are carried out.

A recording operation with the AV/N change-over switch SW3 operated for the N mode will now be described.

When the image recording switch SW2 is operated, Step 146 is effected after Steps 106, 108 and 110. In Step 146, the armature of the head change-over switch 12D is moved to the contact AH. In the following Step 148, a video signal is recorded. In Step 150, the magnetic head 50 is moved by one track inwardly. In Step 152, the value of N is increased.

When the sound recording switch SW1 is operated, Step 154 is effected after Steps 106, 108 and 124. In Step 154, the armature of the head change-over switch 12D is set to the contact AH. In the following Step 156, a time compressed audio signal is recorded. In Step 134, the magnetic head 50 is moved by one track inwardly, and in Step 136, the value of N is increased.

That is, in the N mode, only the A head element 50A is used, and after a video signal or time compressed audio signal is recorded, the magnetic head 50 is moved by one track inwardly. Accordingly, video tracks and audio tracks are arranged as desired, and video signal and time compressed audio signals can be recorded successively with no space between the tracks. Therefore, in the case where no after-recording operation is required, the recording area of the magnetic disc 38 can be effectively used in its entirety.

In the case where only video signals are recorded on some or all of the video tracks in the AV mode, an after-recording operation can be achieved as follows: The AV mode is maintained as it is, or it is changed into the N mode. Under this condition, the track number increment switch SW5 or the track number decrement switch SW6 is operated so that the A head element 50A of the magnetic head 50 is shifted to a video track, and the sound recording switch SW1 is operated to start the after-recording operation.

The recording device for an electronic still camera described above has two operating modes: the AV mode and the N mode. However, it should be noted that the invention is not limited thereto or thereby. For instance, the recording device may be designed so as to have an after-recording mode in addition to the AV mode and the N mode. More specifically, the recording device may be so designed that, in the after-recording mode, it will operate as follows:

(1) The A head element 50A is moved to the first audio track (i.e., the first track).

(2) It is determined whether an audio signal has been recorded on the track.

(3) When it is determined that an audio signal has been recorded on the track, the magnetic head is automatically moved by two tracks inwardly, and the operation in (2) above is carried out.

(4) When it is determined that no audio signal has been recorded on the track, the magnetic head is not moved.

(5) When the sound recording switch SW1 is operated, a compressed audio signal is recorded, the magnetic head is moved by two tracks inwardly, and then the operation in (2) above is carried out.

An after-recording operation can be readily achieved through the above-described operations.

With the recording device of the invention, in the AV mode the video signal recording tracks and the audio signal recording tracks are arranged alternately. Therefore, instead of the employment of video sub-codes and audio sub-codes as described above, the range to be recorded in the AV mode is recorded, for instance, in an ID code user's area, or a code (one bit) representing the fact that a recording track is used for a recording operation in the AV mode is recorded in the user's area.

In the above-described embodiment, the magnetic head 50 has two head elements. However, the recording device according to the first embodiment of the invention may be designed so that it has only one head element. In this case, the movement of the magnetic head is not fully effective when compared with the case where the two head elements are employed.

In the recording device for an electronic still camera according to the first or second embodiments of the invention, in response to the video signal recording instruction provided by operating the image recording switch, a video signal is recorded on the track which is two tracks away in one direction from the track on which the preceding video signal has been recorded, and in response to the audio signal recording instruction provided by operating the sound recording switch, a compressed audio signal is recorded on the track which is one track away in the same direction from the track on which the preceding video signal has been recorded. Therefore, video signals and audio signals can be recorded in pairs. Furthermore, in the case where, after a video signal is recorded, a corresponding audio signal is not recorded but the following video signal is recorded, the recording operation can be achieved merely by operating the image recording switch only once. That is, the recording device of the invention can be readily operated.

Moreover, with the recording device of the invention, the video signal recording tracks and the audio signal recording tracks are arranged alternately. Therefore, the time required for movement of the magnetic head is short and hence the recording or reproducing operation can be started quickly.

In the recording device for an electronic still camera according to the second embodiment of the invention, the recording head has two head elements X and Y which confront two respective adjacent tracks at the same time, and the control means responds to the audio signal recording instruction provided through the operation of the sound recording switch to cause the head element X to record a compressed audio signal on the memory disc and then move the recording head one track towards the head element Y, and responds to the video signal recording operation provided through the operation of the image recording switch, to carry out the following operations according to the preceding instruction. That is, in the case where the preceding instruction is an audio signal recording instruction, the control means causes the head element X to record a video signal on the memory disc and then move the recording head one track towards the head element Y, and in the case where the preceding instruction is a video signal recording instruction, the control means causes the head element Y to record a video signal on the memory disc and then move the recording head two tracks towards the head element Y. Thus, the concentric video signal recording tracks and time compressed audio signal recording tracks are arranged alternately on the memory disc, and therefore, it is unnecessary to move the recording head again immediately before the recording operation. Accordingly, the number of times of movement of the recording head is minimized and the recording head can be moved efficiently. Therefore, overworking of the head driving device is prevented. In addition, the signal recording or reproduction operation can be started quickly.

What is claimed is:

1. A recording device for an electronic still camera, comprising:

control means;

recording drive means controlled by said control means to move a recording head by a predetermined track pitch;

a video/audio change-over switch controlled by said control means to selectively supply a video signal or time-compressed audio signal to said recording head so that video signals and compressed audio signals are recorded on a memory disc with said recording head;

a video signal recording switch for inputting a video signal recording instruction; and an audio signal recording switch for inputting an audio signal recording instruction, said control means, in response to said video signal recording instruction, operating to record a video signal on a first track, and, in response to said audio signal recording instruction, operating to record a time-compressed audio signal on a track which is removed by a one-track pitch in one direction from said first track, said video signal and audio signal being recorded on said memory disc alternately.

2. A recording device for an electronic still camera comprising:

control means;

recording head drive means controlled by said control means for moving a recording head by a predetermined track pitch;

a video/audio change-over switch controlled by said control means for selectively supplying a video signal or time-compressed audio signal to said recording head so that video signals and time-compressed audio signals are recorded on a memory disc with said recording head;

a video signal recording switch for inputting a video signal recording instruction; and an audio signal recording switch for inuptting an audio signal recording instruction;

said recording head comprising first and second head elements which face two adjacent tracks simultaneously, said control means, in response to said video signal recording instruction, causing said first head element to record said video signal on a memory disc and then moving said recording head by a one-track pitch towards said second head element, and, in response to said audio signal recording instruction, causing said first head element to record said audio signal on said memory disc and then moving said recording head by a one-track pitch toward said second head element, and in the case where the preceding instruction is said audio signal recording instruction, causing said first head element to record a video signal on said memory disc and then moving said recording head by a one-track pitch towards said second head element, whereby video signal recording tracks and time-compressed audio signal recording tracks are arranged alternately on said memory disc.

3. A recording method for an electronic still camera, comprising the steps of: recording, in response to a video signal recording instruction, a video signal on a track which is removed by a two-track pitch in one direction from the track where a preceding video signal has been recorded; and, in response to an audio signal recording instruction, recording a compressed audio signal on a track which is removed by a one-track pitch in the same direction from said track where the preceding video signal was recorded.

4. A recording method for use in an electronic still camera having a first and second head element which confront two respective adjacent tracks at the same time, said method comprising the steps of: in response to an audio signal recording instruction, recording with a first head element a compressed audio signal on a memory disc; moving said recording head by one-track pitch towards a second head element; in response to a video signal recording instruction, in the case where the preceding instruction is an audio signal recording instruction, recording with said first head element a video signal on said memory disc, and then moving said recording head by a one-track pitch toward said second head element, and in the case where the preceding instruction is said video signal recording instruction, recording with said second element a video signal on said memory disc and then moving said recording head by a two-track pitch towards said second head element, whereby video signal recording tracks are arranged alternatively on said memory disc.

* * * * *